(12) United States Patent
    Roberts

(10) Patent No.: US 11,254,044 B2
(45) Date of Patent: Feb. 22, 2022

(54) DISPOSABLE MICROWAVE OVEN LINER

(71) Applicant: Justin Roberts, Farmington, MO (US)

(72) Inventor: Justin Roberts, Farmington, MO (US)

( * ) Notice: Subject to any disclaimer, the term of this patent is extended or adjusted under 35 U.S.C. 154(b) by 427 days.

(21) Appl. No.: 16/420,704

(22) Filed: May 23, 2019

(65) Prior Publication Data

US 2019/0358891 A1    Nov. 28, 2019

Related U.S. Application Data

(60) Provisional application No. 62/675,279, filed on May 23, 2018.

(51) Int. Cl.
| | |
|---|---|
| *H05B 6/80* | (2006.01) |
| *H05B 6/64* | (2006.01) |
| *F24C 15/16* | (2006.01) |
| *B29C 63/26* | (2006.01) |
| *B32B 27/10* | (2006.01) |

(52) U.S. Cl.
CPC .............. *B29C 63/26* (2013.01); *B32B 27/10* (2013.01); *H05B 6/6408* (2013.01); *H05B 6/6402* (2013.01)

(58) Field of Classification Search
CPC ..... B29C 63/0056; B29C 63/26; B29C 63/30; B29L 2031/762; B32B 2250/02; B32B 2307/7265; B32B 27/10; B32B 3/08; H05B 6/6402; H05B 6/6408

USPC ....... 219/756, 733, 392, 735, 725, 732, 395, 219/403, 751; 126/39 M, 19 M, 19 R; 99/DIG. 14, 444; 426/243.273 A
See application file for complete search history.

(56) References Cited

U.S. PATENT DOCUMENTS

| | | | | |
|---|---|---|---|---|
| 4,633,052 A | * | 12/1986 | Beavers | F24C 15/007 |
| | | | | 126/39 M |
| 4,757,940 A | * | 7/1988 | Quick | B32B 29/005 |
| | | | | 229/5.84 |
| 2012/0043317 A1 | * | 2/2012 | Russell | A23L 5/15 |
| | | | | 219/730 |

* cited by examiner

*Primary Examiner* — Quang T Van

(57) ABSTRACT

A liner (10) for lining a microwave oven (M) to prevent food from adhering to the top (T), sides (R, L), and floor (F) of the microwave during the cooking of food. The liner has a top panel (12), and three side panels (18, 20, 22) which are initially folded in place with the top panel of the liner first being installed and then the other panels in a prescribed sequence. A two-sided tape (14) is used for adhering the panels to corresponding sides of the microwave. The liner further includes a panel (28) similarly installed on the floor of the microwave, this piece having a central opening which exposes the turntable installed in the floor of the microwave. A separate circularly shaped panel (30) attaches to the top of the turntable.

5 Claims, 2 Drawing Sheets

DISPOSABLE MICROWAVE OVEN LINER

REFERENCE TO RELATED APPLICATIONS

This applications is based on, and claims the benefit of, U.S. provisional patent application 62/675,279 filed May 23, 2018, and which is incorporated herein by reference.

BACKGROUND OF THE INVENTION

This invention relates to liners for microwave ovens; and, more particularly, to a disposable microwave oven liner.

Recent studies have indicated that there are more than 126,000,000 U.S. households having at least one microwave oven. As is well-known, the great advantage of such ovens is that they can greatly speed-up food preparation whether for meals or snacks. Typically food heated in a microwave oven is placed on a paper plate which may or may not be covered by a napkin, paper towel, or the like; or, in some type of container which is open at the top or has a removable lid. Because of the heat generated within the microwave during a cooking process, even if a container is covered, food particles often get spewed about and adhere to the top, sides, and bottom of the microwave, causing a mess which needs to be cleaned. If the particles are left to dry, cleanup becomes more difficult. Also, if food is placed in a microwavable container and a lid or cover is placed over the top of the container. The lid or cover usually has openings in it to relieve any pressure buildup in the container as the food is heated. Again, food particles will often be spewed about through the openings and adhere to the top, sides, and bottom of the microwave.

Because of this, it will be appreciated that the availability and use of a disposable microwave liner has certain benefits. One, of course, is that a liner prevents food from adhering to the top, sides, and bottom of the oven. Cleaning out the oven is then simplified to removing a contaminated liner and replacing it with a new one with a considerable savings in time. However, while microwave liners have heretofore been available, these tend to be bulky in size, relatively difficult to install and remove, and they are relatively expensive. The disposable liner of the present invention not only solves these problems, but reduces paper usage and waste by not having to use paper plates, napkins, or paper towels to cover food during the microwaving of it. Given the number of households noted above, as well as the number of restaurants and other places where food is prepared, there should be a significant market, not only in the U.S., but in foreign countries as well, for such a liner.

BRIEF SUMMARY OF THE INVENTION

The present invention is directed to a liner for use in a microwave oven to prevent food from adhering to the top, sides, and bottom of the microwave.

The liner comprises a package having a top panel and three side panels which are initially folded in place with a top portion of the liner first being installed in the microwave and pressed into place. Then, the other panels are sequentially unfolded and pressed into place. Separate panels are provided for covering the floor of the microwave and a turntable installed in the floor. A two-sided tape is used for adhering the panels in place within the microwave.

Each panel of the liner comprises an outer, lightweight paper layer which abuts against the sides of the microwave, and an inner microwave safe polymer layer which is impenetrable to any liquids or solid particles which would otherwise stick or adhere to the sides of the microwave.

The sides of the liner have removable sections which expose any vents in the sides of the microwave to insure the microwave's safe operation.

The liner can be left in place as long as desired and then easily removed and replaced with the liner which is removed being readily and safely disposed of.

The liner is available is single packs or multiple packages and are relatively inexpensive.

The liner is available in different sizes to fit different size microwave ovens; although a single sized liner is usable for different sized microwave ovens.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF THE INVENTION

The following detailed description illustrates the invention by way of example and not by way of limitation. This description clearly enables one skilled in the art to make and use the invention including what is currently believed to be the best mode for carrying out the invention. It will be understood that is not limited in its application to the details of construction and arrangement of components set forth in the following description or illustrated in the accompanying drawings. The invention is capable of other embodiments and of being practiced or carried out in various ways. Also, the phraseology and terminology used herein is for the purposes of description and should not be regarded as limiting.

Figure 1:
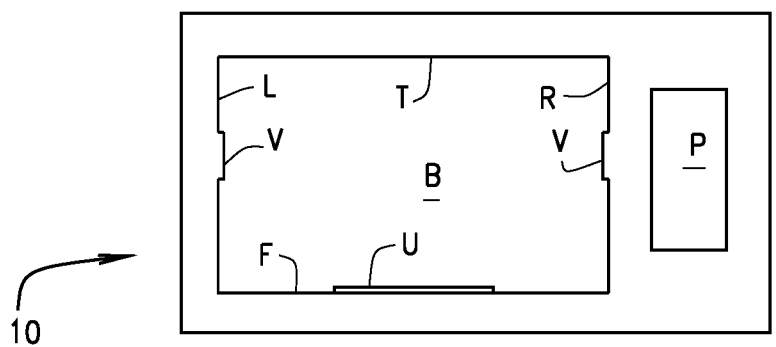
FIG. 1 is a front view of a microwave oven with the cover of the oven removed.

Referring to the drawings, the interior of a microwave oven M is shown in FIG. 1 to have a top wall T, back wall B, floor F, and left and right sidewalls L and R respectively. Vents V are typically formed in these sidewalls usually near the top of the walls, these being indicated in FIG. 1 as slight outward extensions of the respective sidewalls. A turntable U is typically mounted in floor F with plates and containers being placed on the turntable for cooking in the microwave. Microwave oven M also has a door (not shown) and a control panel P having a plurality of controls (not shown) for operating the oven.

Figure 2A:
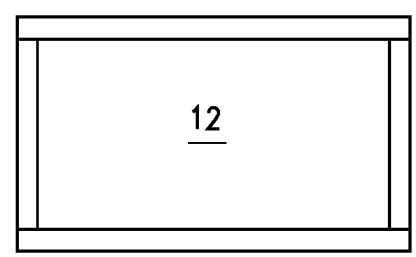
FIGS. 2A and 2B are respective top and side views of a microwave oven liner of the present invention in its folded condition.
Figure 2C:
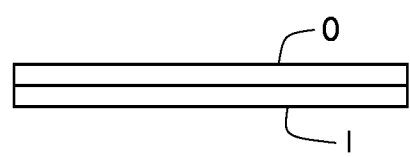
FIG. 2C illustrates the construction of the liner panels.
Figure 3:
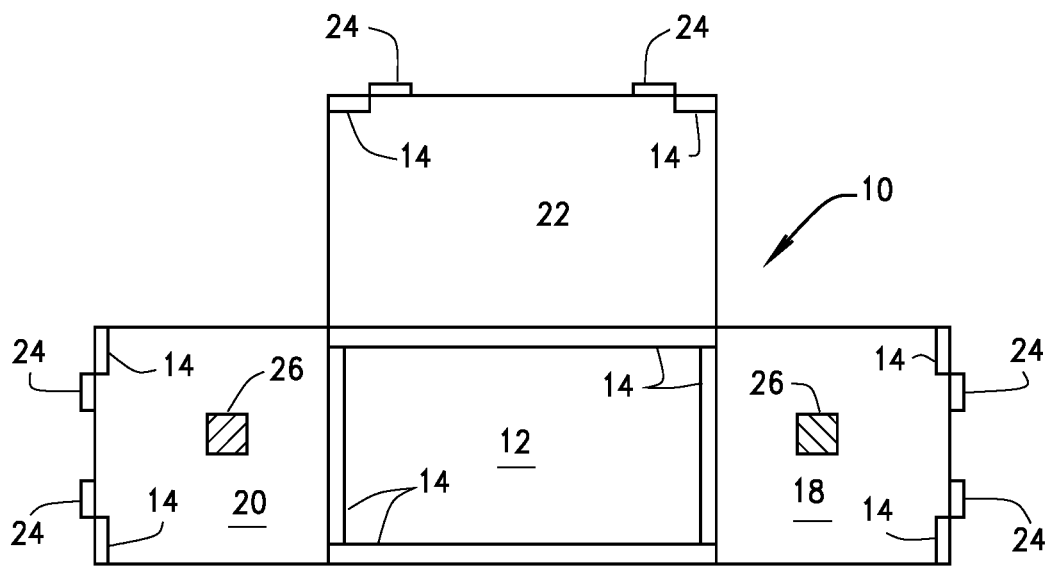
FIG. 3 illustrates the microwave oven liner when unfolded.
Figure 4:
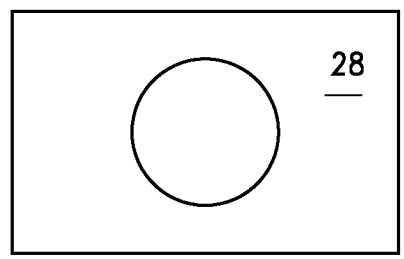
FIG. 4 illustrates a liner cover for the floor of the microwave and a turntable mounted in the floor; and, FIGS. 5A and 5B illustrate different shapes of tape used to adhere liner panels to the interior walls of the microwave oven.
Figure 4:
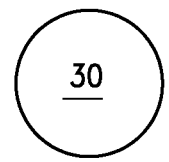

A disposable liner 10 of the present invention is shown to include a plurality of panels which, as described herein, cover the top, back, and sides of the oven. In FIG. 3, a top panel 12 of the liner is fitted against top wall T of the oven. Along each edge of top panel 12 is a two-sided adhesive strip 14 which, as shown in FIG. 3, extends lengthwise of each side of the panel. Those skilled in the art will appreciate that the strips 14 may only be at the respective corners of the panel rather than extending the length of each side thereof. When liner 10 is installed, a cover 16 (see FIG. 2A) over each strip 14 is removed by the user who then presses the edges of panel 12 against the top wall of microwave oven M to fix the top panel in place using the strips. As shown in FIG. 2C, panel 12, and all the other panels of liner 10, each comprise two layers, an outer, lightweight paper layer O which abuts against the sides of the oven, and an inner microwave safe polymer layer I which is impenetrable to any liquids or solid particles which would otherwise adhere to and contaminate the walls of the microwave oven.

Figure 2B:
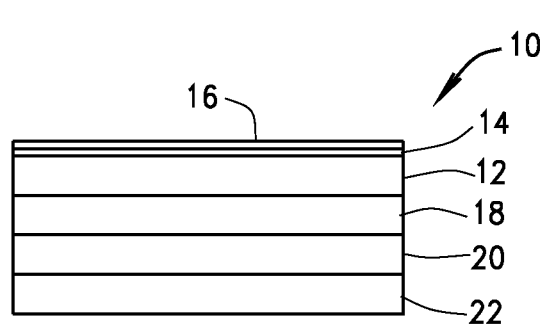

In FIG. 2B, liner 10 shown in a folded assembly condition prior to installation in microwave M. The liner assembly has a top layer comprising panel 12, a second layer 18 comprising one side (right) panel of the liner, a third layer 20 comprising the other side (left) panel, and a fourth layer 22 comprising the back panel. Referring to FIG. 3, each panel has one or more tabs 24 connected to the panel at its lower end. The user pulls on the tabs 24 to release the respective panel from the folded assembly in an appropriate order or sequence. At the lower end of each panel is another two-sided adhesive strip 14 with a cover piece 16 over it. When a respective panel is set in place, the cover piece 16 is removed from the strips 14 and the user then presses against the lower end of the panel to force the adhesive strips against the respective side or back wall, and affix the panel in place.

As shown in FIG. 3, side panels 18 and 20 each have a removable section 26. These sections are located adjacent vents V in the sidewalls of microwave M. If desirable, the user removes these sections during the installation of the panels 18, 20 so to expose the vents after a liner panel is in place.

As noted, turntable U is mounted on floor F of the oven. Plates or containers placed on the turntable rotate during a microwave heating to insure uniformity in the heating of the food placed on the plate or in the container. To prevent spillage from the plates or containers onto floor F, liner 10 next includes a panel 28 sized to cover the floor. The panel has a central opening sized to accommodate the turntable. A circular panel 30 corresponding in size to this opening is provided as part of liner 10. Panel 30 attaches to the turntable to prevent spillage onto the turntable. Each panel 28, 30 has two-sided adhesive strips (not shown) similar to the strips 14 which are used to secure the panels to the floor and turntable respectively. The panels may be stored within the folded liner 10 and removed when the liner is unfolded, or they may be kept separately within a package in which liner 10 is sold.

Figure 5A:
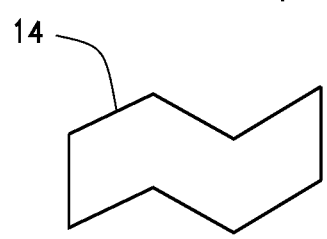
Figure 5B:
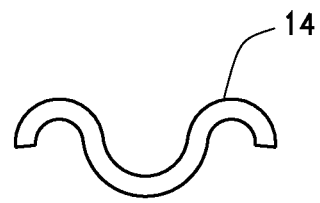

Finally, referring to FIGS. 5A and 5B, the shape of the adhesive strips 14 may have a zig-zag (FIG. 5A) or sinusoidal (FIG. 5B) pattern rather than being a straight strip of adhesive material.

It will be understood by those skilled in the art that the dimensions of the panels of liner 10 may, for some microwaves, be larger than the interior dimensions of the microwave. In such instances, the user can readily fold the panels so they fit within the microwave; doing so, affecting neither the ease of installation of the liner or its effectiveness in keeping the top, sides, and bottom of the microwave free. In addition, liner 10, which is available in single packages or multiple packs also comes in different sizes to accommodate different size microwave ovens.

In view of the above it will be seen that the several objects and advantages of the invention have been achieved and other advantageous results obtained.

The invention claimed is:

1. In an interior of a microwave oven having a top wall, back wall, floor, and left and right sidewalls, a disposable liner comprising a plurality of panels which respectively cover the top wall, back wall, and sidewalls of the oven, the panels including a top panel which is fitted against the top wall of the oven, a panel which is fitted against the back wall of the oven, and panels which respectively fit against the side walls of the oven;

each of the panels comprising two layers of material, an outer, lightweight paper layer which abuts against the respective top wall, back wall, or sidewalls of the oven, and an inner microwave safe polymer layer which is impenetrable to any liquids or solid particles which would otherwise adhere to and contaminate the top, back, or sides of the microwave oven; and the disposable liner being in a folded assembly prior to its installation in the microwave oven, the liner, in this assembly having a top layer comprising the top wall panel, a second layer comprising one of the sidewall panels, a third layer comprising the other sidewall panel, and a fourth layer comprising the back wall panel, each panel having at least one tab connected to the respective panel at its lower end, a user of the liner pulling on the tabs to release the respective panel from the folded assembly in an appropriate sequence.

2. The disposable liner of claim 1 further including a two-sided adhesive strip extending lengthwise of each side of a panel, or located only at the respective corners of the panel; wherein, after a liner panel is installed, a cover over each strip is removed by a user who then presses the edges of panel against the respective wall of the microwave oven to fix the panel in place using the strips.

3. The disposable liner of claim 2 wherein the microwave oven has vents formed in the respective sidewalls of the oven, and each sidewall panel of the liner has a removable section located adjacent a vent, the removable panel sections being removed after the side wall panels are installed so to expose the vents after the liner is in place.

4. The disposable liner of claim 1 wherein the microwave oven further includes a floor and a turntable mounted on the floor for plates or containers placed on the turntable to rotate during a microwave heating and insure uniformity in the heating of the food placed on the plate or in the container, and the disposable liner further includes a panel sized to cover the floor, the panel having a central opening sized to accommodate the turntable.

5. The disposable liner of claim 4 further including a panel corresponding in size to the central opening and attached to the turntable to prevent spillage onto the turntable.

* * * * *